3,667,863
ROTOR HUB AND BLADE ATTACHMENTS
     Gerald L. Breuner, 50 Melody Lane,
           Orinda, Calif. 94563
       Filed Feb. 3, 1970, Ser. No. 8,232
            Int. Cl. B64c 27/38
U.S. Cl. 416—138                      8 Claims

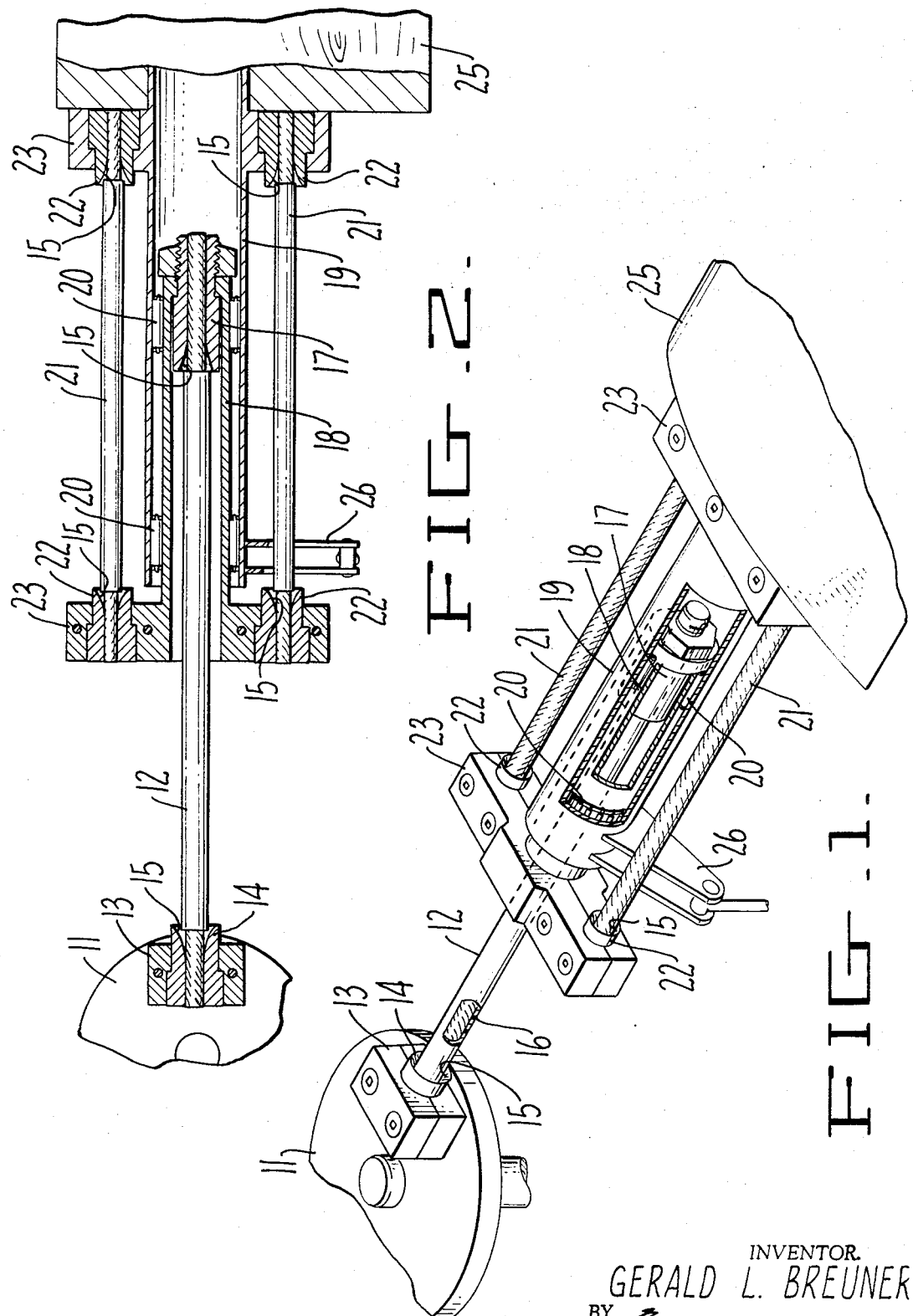

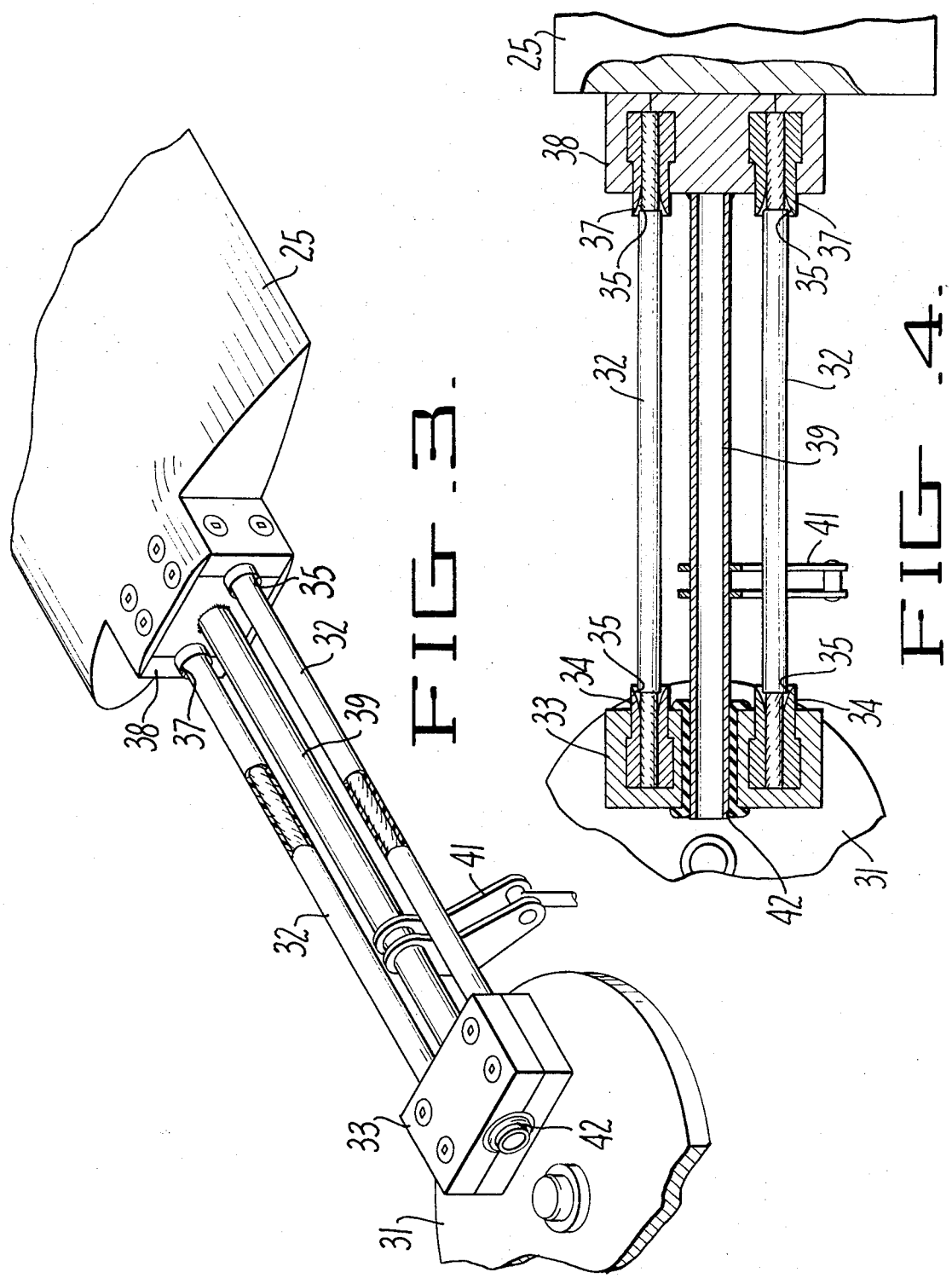

ABSTRACT OF THE DISCLOSURE

This invention relates to an improved attachment for a rotor blade in a rotating wing aircraft having a semi-rigid rotor system. More particularly, the invention provides a low cost, lightweight, low maintenance rotor system embodying all of the desired characteristics of the semi-rigid hub but with a minimum chance of fatigue or failure.

BACKGROUND OF THE INVENTION

The attaching of a rotor blade in a rotating wing aircraft has been a problem for several reasons. This invention is the outgrowth of a search for a solution to these problems. The result is a rotor blade attachment that has: economies of manufacturing and maintenance, weight reduction, reliability through simplicity and choice of materials of known performance, and improved control pressure and aircraft stability.

SUMMARY OF THE INVENTION

In this invention, multi-stranded cable is substituted for the previously used lead-lag and flap hinges of the fully articulated rotor system. Also, cable is utilized instead of the centrifugal thrust bearings found in most previous rotor hubs. The limited movement or semi-rigidity embodied in the rotor system of this invention provides a greater moment of control pressure between rotor blade and rotor hub without imposing the stresses on the hub and blades of the fully rigid rotor system. The multi-stranded cable employed as a part of this invention is fully capable of carrying the large centrifugal loads while allowing the small amount of blade deflection required in the lead-lag and flap cycles with little chance of structural fatigue or failure. Also, a twisted cable connection is preferable to straight strands as each strand of the cable acts, to a small degree, as a torque rod allowing the strands to twist rather than having to deflect as on stranght stranded types. The cable, with swaged or fused end fittings, is, in most cases, sufficiently rigid to support the static load of the rotor blade, yet flexible enough to relieve all gyroscopic and other forces.

Also, in accordance with this invention the cable is suitably covered because I have found that the cable covering not only protects and bonds the cable strands, thus limiting deflection, but also dampens any vibrations in the blade support system. A semi-rigid rotor system of this type gives an instant and positive directional response to a control movement, giving very stable directional control to the aircraft. This will also give control pressures sufficient to allow a wide range of aircraft center of gravity positions.

As will appear, two different cable configurations are used, a single cable configuration and a double cable configuration. In the single cable configuration, one main cable is used as a replacement of the lead-lag and flap hinges. This single main cable connects the rotor hub to the blade through a set of pitch change tubes and bearings. A rotor blade support tube, enclosing and concentric with the cable, revolves pitchwise on bearings about an inner cable tube which is fixed to the outboard end of the main cable. The rotor blade is rotated about the pitch change axis by control pressure through the nomal control arm fixed to the inboard end of the rotor blade support tube. To reduce the number of bearings usually used in rotating wing rotor hubs, and as an additional part of this invention, a secondary pair of cables and fittings are incorporated between the inner fixed cable tube and the rotor blade support tube to carry the centrifugal thrust load previously carried by thrust type bearings.

The double cable configuration is used in rotor hub applications where a greater chordwise stiffness is desired. Tandem cables are employed in the plane of rotor rotation. These cables are spaced and angled to achieve the desired in-plane stiffness. The double cable configuration does not require the fixed cable tube and rotating blade support tube of the single cable configuration. The secondary thrust load bearing cables of the single cable configuration are not required as the pitch change of the rotor blades is achieved through a twisting of the two tandem cables through a pitch control arm and rod running parallel to and between the two tandem cables. The centrifugal load and the lead-lag and flap deflection is accommodated by the tandem cables. These cables are of opposite twist so as not to impart a torque moment during the stretching due to centrifugal force.

It is in general a broad object of the present invention to provide an improved attachment of a rotor blade in a semi-rigid rotor system in a rotating wing aircraft.

Another object of the present invention is to provide a simplified connection of a rotor blade in a semi-rigid system of a rotating wing aircraft.

These and other objects and advantages will become more apparent from the following description considered in connection with the accompanying drawings; it being expressly understood, however, that the drawings are for the purpose of illustration and description only, and are not intended as a definition of the limits of the invention.

BRIEF DESCRIPTION OF THE DRAWINGS

FIG. 1 is a perspective view partly in section illustrating certain details of the internal construction of the single cable rotor system.

FIG. 2 is a plan view in section illustrating additional details of the single cable rotor system.

FIG. 3 is a perspective view illustrating certain details of the double cable rotor system with a portion of the cable covering removed.

FIG. 4 is a plan view in section illustrating additional details of the double cable rotor system.

DESCRIPTION OF THE PREFERRED EMBODIMENT

The single cable configuration of this invention is shown in FIGS. 1 and 2 wherein the usual hinges at the rotor hub 11 are replaced by a cable 12 which is held at the rotor hub by a fixture block or cross member 13 which secures the cable end fitting 14 to the rotor hub. The end fitting 14 is swaged or otherwise attached to the cable and incorporates a long radius relief chamfer 15 to eliminate fatigue from flexing in the cable at that point. The cable fitting 14 is set at an angle in the fixture block 13 which angle approximates the average coning angle in flight so that the pull on the cable is approximately straight. Preferably the cable is covered between the end fittings as at 16 in a polypropylene or other suitable material such as Macwhyte 6 X 19G Preformed Premium Plastic Coated IWRC wire to help bond the cable strands, to impart rigidity in the cable and to dampen cable vibration.

The outboard end of the cabile 12 is secured in another end fitting 17 which also rigidly supports an inner fixed cable tube 18. An outer rotor blade support tube 19 can rotate pitchwise about the inner cable tube 18 on needle bearings 20. The centrifugal thrust load is carried between the inner fixed cable tube and the outer blade support tube by a secondary set of cables 21, fittings 22 and end fixtures 23, one of which is secured to the rotor blade. The blade support tube 19 extends into and is secured to the rotor blade 25. A pitch control arm 26 is attached to the inboard end of the blade support tube 19 and operates in the conventional manner.

In the double cable configuration of this invention shown in FIGS. 3 and 4, the usual hinges at the rotor hub 31 are replaced by two cables 32 each of which is held at the rotor hub by a fixture or block 33 which secures the cable end fittings 34 to the rotor hub. These end fittings are swaged or otherwise attached to the cables and incorporate a long radius relief chamfer 35 to eliminate fatigue from flexing in the cables at that point. The cable fittings are also set at an angle in the fixture block that approximates the average coning angle in flight so that the pull on the cables is approximately straight. Also the cables are covered as previously mentioned. It is also desireable that the cables 32 be of an opposite twist to reduce the chance of twist in the outboard fixture. The outboard ends of the cables terminate in two similar end fittings 37 and fixture blocks 38 attached to the rotor blade 25. Rigidly attached to the outboard fixture block between the cables is a pitch control tube 39 which receives control responses from the attached pitch control arm 41. The pitch control tube 39 is loosely supported at 42 in the inboard fixture block 33 and acts secondarily as a rotor blade droop stop.

I claim:

1. In a rotating wing aircraft means for attaching a rotor hub to a rotor blade and for changing the pitch angle of the blade with respect to the hub consisting solely of:
   (a) a pair of spaced substantially parallel cable means attached rigidly at their opposite ends respectively to the rotor hub and to the rotor blade and extending generally in the plane of blade rotation;
   (b) said blade and hub including a radius relief chemfer at the points of attachment of said cable means respectively;
   (c) each cable means of said pair comprising a spirally twisted multi-strand cable with the strands of one cable being of a twist opposite to the strands of the other cable;
   (d) a blade pitch control member secured at one end to the blade and extending from the hub and positioned between and substantially parallel to the cables and in the plane of the cabels and equi-distant from the cables;
   (e) said pitch control member having its other end turnably mounted in said rotor hub; and
   (f) means for rotating the blade pitch control member.

2. In a rotating wing aircraft as claimed in claim 1 and said cable means having a synthetic resin covering layer extending between the attached ends thereof to provide a vibration dampening cover.

3. In a rotating wing aircraft, means for attaching a rotor hub means to a rotor blade comprising first fixture block means secured to the rotor hub means, laterally spaced cable end fittings carried by said first fixture block means, second fixture block means secured to the inboard end of the rotor blade, laterally spaced cable end fittings carried by said second fixture block means, a pair of laterally spaced multistrand, twisted cable means having their opposite ends fixed within fittings carried by said first and second fixture block means, each fitting having a long radius relief chamber outwards of its swaged end to eliminate fatigue in said cables, said cables being of opposite twist to minimize twisting in said second fixture block means, a pitch control member between said cable means and extending between said hub and rotor blade, said pitch control member being attached at its outboard end to the inboard end of said rotor blade, and means for turning said pitch control member.

4. In a rotating wing aircraft as claimed in claim 3 and said pitch control member having its inboard end turnably mounted in said first fixture block means.

5. In a rotating wing aircraft as claimed in claim 3, and said cable means having a synthetic resin covering layer extending between the attached ends thereof to provide a vibration dampening cover.

6. In a rotaing wing aircraft as claimed in claim 1, wherein the pitch control member acts as a rotor blade droop stop.

7. In a rotating wing aircraft as claimed in claim 1, wherein said cable means are set at an agle that approximates the average coning angle in flight.

8. In a rotating wing aircraft as claimed in claim 3, wherein said cable end fittings are set at an angle to said fixture block that approximates the average coning angle in flight.

References Cited

UNITED STATES PATENTS

| | | | |
|---|---|---|---|
| 2,173,153 | 9/1939 | Bennett et al. | 416—141 |
| 2,509,184 | 5/1950 | Brantly | 416—144 |
| 3,434,373 | 3/1969 | Ditlinger | 416—134 UX |
| 2,121,345 | 6/1938 | Hafner | 416—135 X |
| 2,483,912 | 10/1949 | Lampton et al. | 416—134 |
| 2,553,193 | 5/1951 | Hodson et al. | 416—135 |
| 2,757,745 | 8/1956 | Verhage et al. | 416—135 UX |
| 2,809,506 | 10/1957 | McDaniel | 416—135 X |
| 2,949,967 | 8/1960 | Jovanovich | 416—134 |

FOREIGN PATENTS

| | | | |
|---|---|---|---|
| 1,334,446 | 7/1963 | Germany | 416—230 |

EVERETTE A. POWELL, Jr, Primary Examiner

U.S. Cl. X.R.

416—140, 141